(12) United States Patent
Enuka et al.

(10) Patent No.: US 11,243,990 B2
(45) Date of Patent: Feb. 8, 2022

(54) DYNAMIC DOCUMENT CLUSTERING AND KEYWORD EXTRACTION

(71) Applicant: BigID Inc., New York, NY (US)

(72) Inventors: Yehoshua Enuka, Gimzo (IL); Nimrod Vax, Tel Aviv (IL); Eyal Sacharov, Herzliya (IL); Itamar Apel, Nir Galim (IL); David Moyal, Tel Aviv (IL)

(73) Assignee: BigID Inc., New York, NY (US)

( * ) Notice: Subject to any disclaimer, the term of this patent is extended or adjusted under 35 U.S.C. 154(b) by 0 days.

(21) Appl. No.: 17/157,487

(22) Filed: Jan. 25, 2021

(65) Prior Publication Data

US 2021/0150204 A1  May 20, 2021

Related U.S. Application Data

(63) Continuation of application No. 16/710,089, filed on Dec. 11, 2019.

(60) Provisional application No. 62/935,642, filed on Nov. 15, 2019, provisional application No. 62/824,373, filed on Mar. 27, 2019.

(51) Int. Cl.
| | |
|---|---|
| *G06F 16/35* | (2019.01) |
| *G06F 16/31* | (2019.01) |
| *G06K 9/00* | (2006.01) |
| *G06F 40/205* | (2020.01) |
| *G06F 16/13* | (2019.01) |
| *G06K 9/62* | (2006.01) |

(52) U.S. Cl.
CPC .......... *G06F 16/325* (2019.01); *G06F 16/137* (2019.01); *G06F 16/353* (2019.01); *G06F 40/205* (2020.01); *G06K 9/00449* (2013.01); *G06K 9/00483* (2013.01); *G06K 9/6217* (2013.01)

(58) Field of Classification Search
CPC ............................ G06F 16/353; G06F 16/325
See application file for complete search history.

(56) References Cited

U.S. PATENT DOCUMENTS

| | | | |
|---|---|---|---|
| 7,272,602 B2 | 9/2007 | Moulton | |
| 8,543,576 B1 * | 9/2013 | Buryak | ................. G06F 16/353 707/737 |

(Continued)

OTHER PUBLICATIONS

Adi, Yossi et al., Fine-grained Analysis of Sentence Embeddings Using Auxiliary Prediction Tasks, Iclr 2017 Conference, Feb. 9, 2017, p. 13.

(Continued)

*Primary Examiner* — James Trujillo
*Assistant Examiner* — Michal Bogacki
(74) *Attorney, Agent, or Firm* — Zeller IP Group, PLLC; Kyle M. Zeller

(57) ABSTRACT

Systems, methods and apparatuses are disclosed to cluster a plurality of documents located in any number of local and/or remote systems and applications. Preprocessed text is generated for each document, and a hash and a feature vector are determined based on the preprocessed text. A set of clusters is retrieved, wherein each cluster is associated with a hash list and a cumulative feature vector. Each of the documents may then be associated with a cluster by comparing the hash of the document to the hash lists of the clusters and/or by determining similarities between the feature vector of the document and the cumulative feature vectors of the clusters.

18 Claims, 8 Drawing Sheets

(56) References Cited

U.S. PATENT DOCUMENTS

| | | | | |
|---|---|---|---|---|
| 8,774,509 | B1* | 7/2014 | Yagnik | G06T 9/00 |
| | | | | 382/170 |
| 9,002,848 | B1 | 4/2015 | Peng et al. | |
| 10,681,207 | B1* | 6/2020 | Johnson | H04M 3/42042 |
| 2008/0120292 | A1* | 5/2008 | Sundaresan | G06F 16/951 |
| 2008/0201131 | A1* | 8/2008 | Kar | G06F 16/35 |
| | | | | 704/9 |
| 2008/0205775 | A1* | 8/2008 | Brinker | G06F 16/353 |
| | | | | 382/225 |
| 2008/0256040 | A1* | 10/2008 | Sundaresan | G06F 16/338 |
| 2011/0087668 | A1* | 4/2011 | Thomas | G06F 16/355 |
| | | | | 707/738 |
| 2014/0082006 | A1* | 3/2014 | Knight | G06F 16/24 |
| | | | | 707/758 |
| 2015/0220539 | A1 | 8/2015 | Lambert et al. | |
| 2016/0188590 | A1* | 6/2016 | Cole | G06F 16/9537 |
| | | | | 707/747 |
| 2017/0147676 | A1* | 5/2017 | Jaidka | G06F 16/35 |
| 2018/0096057 | A1* | 4/2018 | Zheng | G06N 20/10 |

OTHER PUBLICATIONS

Bryan, McCann et al., Learned in Translation: Contextualized Word Vectors, 31st Conference on Neural Information Processing Systems, 2017, p. 12.

International Search Report and Written Opinion issued for PCT/US2019/0655590, dated Feb. 21, 2020, 12 pp.

Jesse, Kornblum et al., Identifying Almost Identical Files Using Context Triggered Piecewise Hashing, Digital Investigation 3S, Aug. 2006, pp. S91-S97.

Jonathan, Oliver et al., TLSH—A Locality Sensitive Hash, 4th Cybercrime and Trustworthy Computing Workshop, Sydney, Nov. 2013, pp. 7.

Sanjeev, Arora, et al., A Simple but Tough-to-Beat Baseline for Sentence Embeddings, ICLR 2017 Conference, 2017, pp. 16.

Sumayia, Al-Anazi et al., Finding Similar Documents Using Different Clustering Techniques, Procedia Computer Science, Mar. 30, 2016, pp. 28-34, 82.

Yasir, Safeer et al., Clustering Unstructured Data (Flat Files)—An Implementation in Text Mining Tool, International Journal of Computer Science and Information Security, 2010, pp. 174-180, 8(2).

\* cited by examiner

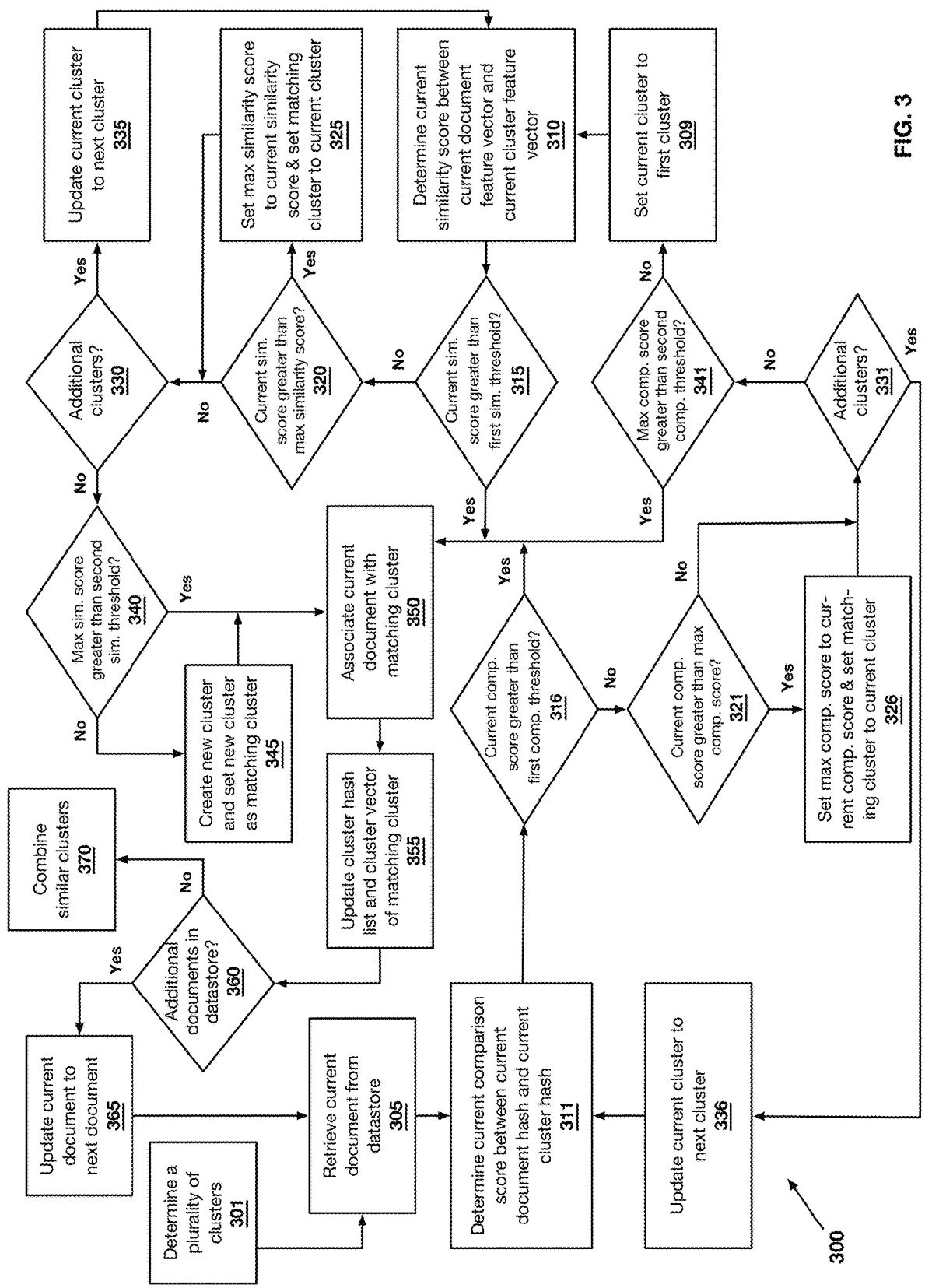

DYNAMIC DOCUMENT CLUSTERING AND KEYWORD EXTRACTION

CROSS-REFERENCE TO RELATED APPLICATIONS

The present application is a continuation of U.S. utility patent application Ser. No. 16/710,089, titled "Dynamic Document Clustering and Keyword Extraction," filed Dec. 11, 2019, which claims the benefit of U.S. provisional patent application Ser. No. 62/824,373, titled "Dynamic Document Clustering and Keyword Extraction," filed Mar. 27, 2019 and U.S. provisional patent application Ser. No. 62/935,642, titled "Dynamic Document Clustering and Keyword Extraction," filed Nov. 15, 2019. Each of the above applications is incorporated by reference herein in its entirety.

BACKGROUND

This specification relates generally to organizing unstructured data. More specifically, this specification relates to systems and methods for classifying unstructured documents into clusters of unstructured information stored in any number of data sources and for monitoring access to such information to manage customer privacy.

In the digital economy, preserving customer confidence and trust requires protecting their personal identity information from loss, theft and misuse. Information technology and the Internet have made it easier to steal personal information through breaches of Internet security, network security and web browser security, leading to a profitable market in collecting and reselling personal information. Personal information may also be exploited by criminals to stalk or steal the identity of a person, or to aid in the planning of criminal acts.

The primary challenge most organizations face today, as it relates to data protection, is understanding where customers' personal information is located across the organization's data centers. Although a number of software solutions exist to allow organizations to identify and protect personal information stored in structured files and databases, such solutions are not applicable to unstructured content, such as documents (e.g., text files, word processing documents, presentations, etc.) stored in file shares, personal computing devices, content management systems and various other internal and external systems. Unfortunately, unstructured files are ubiquitous in today's business environment, as they may be generated using many applications, stored as and/or converted into multiple file formats, and may include nearly unlimited form and content.

Accordingly, there remains a need for systems and methods that can organize unstructured data into logical units in order to allow for personal information to be identified and understood. Moreover, due to the enormous size and complexity of typical "big data" file shares, it would be beneficial if such solutions were designed to be highly efficient in terms of computation time and memory requirements.

SUMMARY

In accordance with the foregoing objectives and others, exemplary embodiments are described herein to allow for efficient organization of unstructured data. The described embodiments may employ hybrid, dynamic file clustering algorithms to search documents located across any number of local and/or cloud-based systems and applications to cluster such documents into coherent, logical units according to their contents. In contrast to conventional clustering algorithms, the described embodiments may be employed to cluster documents without previous knowledge of the total number of desired clusters and may be employed in parallel to document scanning functions.

In certain embodiments, the systems and methods described herein may extract important keywords from generated document clusters to provide insights into the contents of underlying documents. Accordingly, the embodiments may detect hidden patterns in unstructured file shares to allow organizations to determine which clusters include documents with personal information and/or documents to which access should be monitored or limited.

In one aspect of the embodiments, a computer-implemented method of clustering a plurality of documents is provided. The method may include: receiving a plurality of documents from one or more data sources; preprocessing a document in the plurality of documents to generate preprocessed text including a plurality of tokens; applying a hashing function to the preprocessed text to calculate a hash of the document; determining a feature vector of the document based on the preprocessed text; retrieving a set of clusters, each cluster associated with one or more associated documents, a hash list, and a cumulative feature vector; determining a comparison score between the hash of the document and each of the hash lists of the clusters; determining a similarity score between the feature vector of the document and each of the cumulative feature vectors of the clusters; and associating the document with a cluster based on the determined comparison scores or the determined similarity scores.

If the comparison score between the hash of the document and the hash list of a matching cluster in the set of clusters is determined to be greater than or equal to a comparison threshold, the document may be associated with the matching cluster. However, if none of the determined comparison scores is greater than or equal to a first comparison threshold, a maximum comparison score may be determined from the determined comparison scores; and, upon determining that the maximum comparison score is greater than or equal to a second comparison threshold that is lower than the first comparison threshold, the document may be associated with the cluster corresponding to the maximum comparison score.

In some cases, the similarity score between the feature vector of the document and each of the cumulative feature vectors of the clusters may be determined when none of the determined comparison scores is greater than or equal to a comparison threshold (e.g., the second comparison threshold). In such cases, the document may be associated with a cluster when the similarity score between the feature vector of the document and the cumulative feature vector of the cluster is determined to be greater than or equal to a first similarity threshold. However, if none of the determined similarity scores is greater than or equal to the first similarity threshold, a maximum similarity score may be determined from the determined similarity scores; and, upon determining that the maximum similarity score is greater than or equal to a second similarity threshold that is lower than the first similarity threshold, the document may be associated with the cluster corresponding to the maximum similarity score.

Additionally or alternatively, the method may include: determining a similarity score between the cumulative feature vectors of a first cluster and a second cluster in the set of clusters; and merging the first cluster with the second cluster upon determining that the similarity score is greater than or equal to a predetermined cluster similarity threshold. It will be appreciated that merging the first cluster with the second cluster may include associating the associated documents of the first cluster with the second cluster; adding the cumulative feature vector of the first cluster to the cumulative feature vector of the second cluster; and/or adding one or more hashes included in the hash list of the first cluster to the hash list of the second cluster.

In certain cases, the method may optionally include determining keywords of a cluster in the set of clusters by, for example: determining a set of tokens for the cluster, the set of tokens including the tokens included in the preprocessed text generated for each of the documents associated with the cluster; calculating a Term Frequency Inverse Cluster Frequency ("TFICF") value for each token in the set of tokens; selecting tokens from the set of tokens based on the calculated TFICF values; and designating each of the selected tokens as a keyword. The keywords may then be displayed or otherwise transmitted (e.g., to a user device).

In another aspect of the embodiments, a machine-readable medium having program instructions stored thereon is provided. The instructions may be capable of execution by a processor and may define steps, such as but not limited to: receiving a plurality of documents from one or more data sources; preprocessing a document in the plurality of documents to generate preprocessed text including a plurality of tokens; applying a hashing function to the preprocessed text to calculate a hash of the document; and determining a feature vector of the document based on the preprocessed text. The instructions may further define steps such as: retrieving a set of clusters, each cluster associated with one or more documents, a hash list including hashes of some or all of the associated documents, and a cumulative feature vector determined based on the feature vectors of some or all of the associated documents; determining a comparison score between the hash of the document and each of the hash lists of the clusters; determining a similarity score between the feature vector of the document and each of the cumulative feature vectors of the clusters; and associating the document with a cluster based on the determined comparison scores or the determined similarity scores.

In certain cases, the instructions may further define steps such as: upon determining that none of the determined comparison scores is greater than or equal to a first comparison threshold, determining a maximum comparison score from the determined comparison scores and/or determining that the maximum comparison score is less than a second comparison threshold that is lower than the first comparison threshold. Upon determining that none of the determined similarity scores is greater than or equal to a first similarity threshold, a maximum similarity score may be determined from the determined similarity scores, wherein the maximum similarity score corresponding to a matching cluster from the set of clusters. If the maximum similarity score is determined to be greater than or equal to a second similarity threshold that is less than the first similarity threshold, the document may be associated with the matching cluster, such that the hash of the document is added to the hash list of the matching cluster and the feature vector of the document is included in the cumulative feature vector of the matching cluster.

Additionally or alternatively, the instructions may define steps such as: determining a set of tokens for the matching cluster, wherein the set includes all of the tokens in the preprocessed text generated for each of the documents associated with the matching cluster; calculating a TFICF value for each token in the set of tokens; selecting, from the set of tokens, a number of selected tokens based on the calculated TFICF values; and designating each of the selected tokens as a keyword of the matching cluster. In some cases, the keywords of the matching cluster may be displayed via a user interface or otherwise transmitted to a user device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an exemplary method 300 of clustering documents according to an embodiment.

DETAILED DESCRIPTION

Various systems, computer-implemented methods, apparatuses and software applications are disclosed that transform unstructured documents into organized, logical units (e.g., units comprised of similar documents) allowing hidden patterns to emerge from unstructured data stores. The described embodiments are very efficient in terms of runtime and memory consumption, and allow for better understanding and control of otherwise unmanageable big data environments. Moreover, the clusters produced by the described embodiments may form the basis for many higher order processes, such as recommendations for access governance, subject access requests and other data discovery applications.

Figure 1:
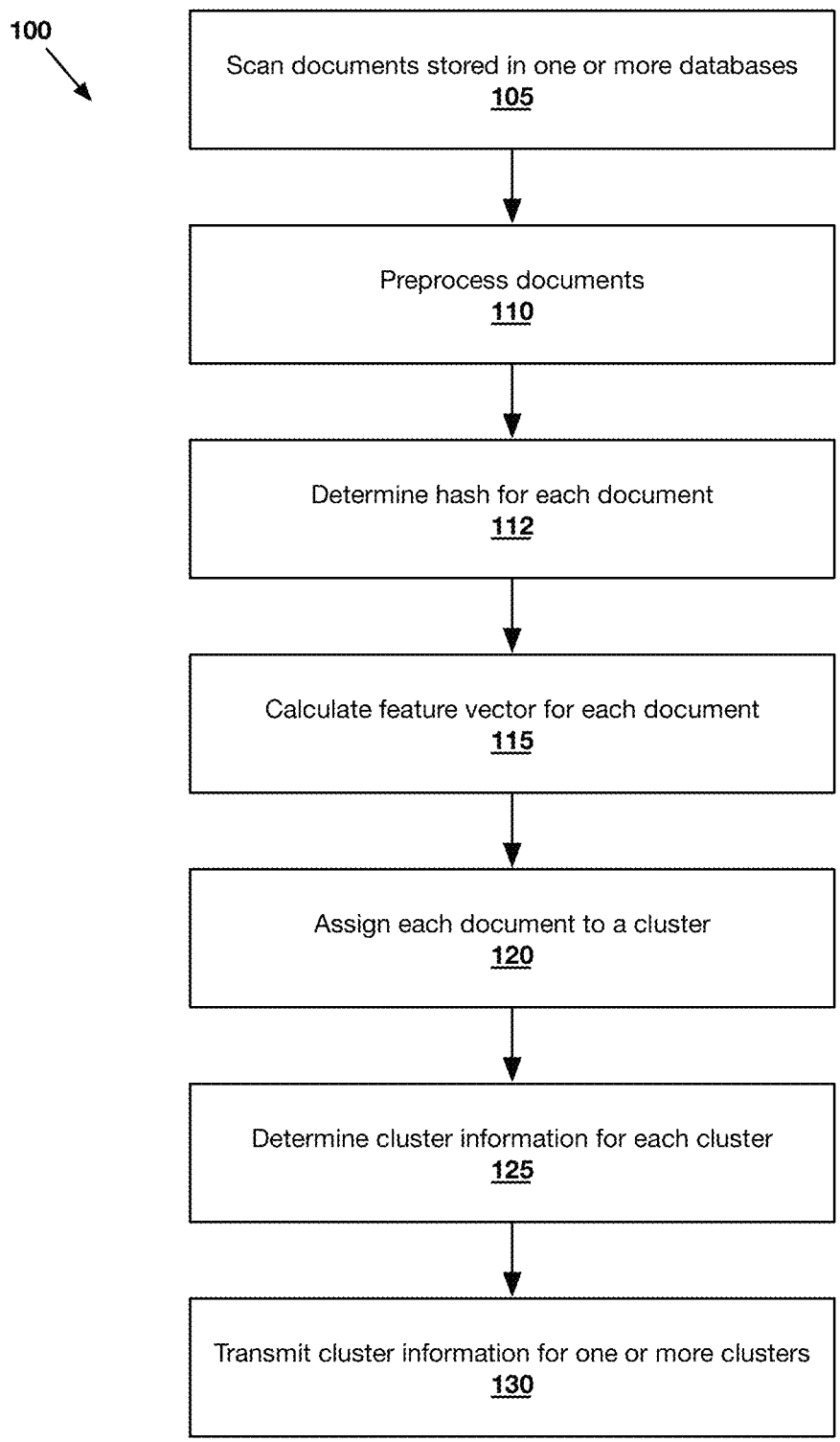
FIG. 1 shows an exemplary document clustering and keyword extraction method 100 according to an embodiment.

Referring to FIG. 1, an exemplary overview method 100 according to an embodiment is illustrated. As shown, the method 100 includes scanning one or more unstructured data sources to retrieve documents 105, preprocessing the retrieved documents 110, calculating a hash for each of the preprocessed documents 112, generating a feature vector for each of the preprocessed documents 115, associating each of the documents with a cluster 120, determining cluster information, such as important keywords, for each cluster of documents 125, and/or displaying such cluster information for one or more of the document clusters 130. Each of the steps shown in FIG. 1 is described in detail below.

Figure 2:
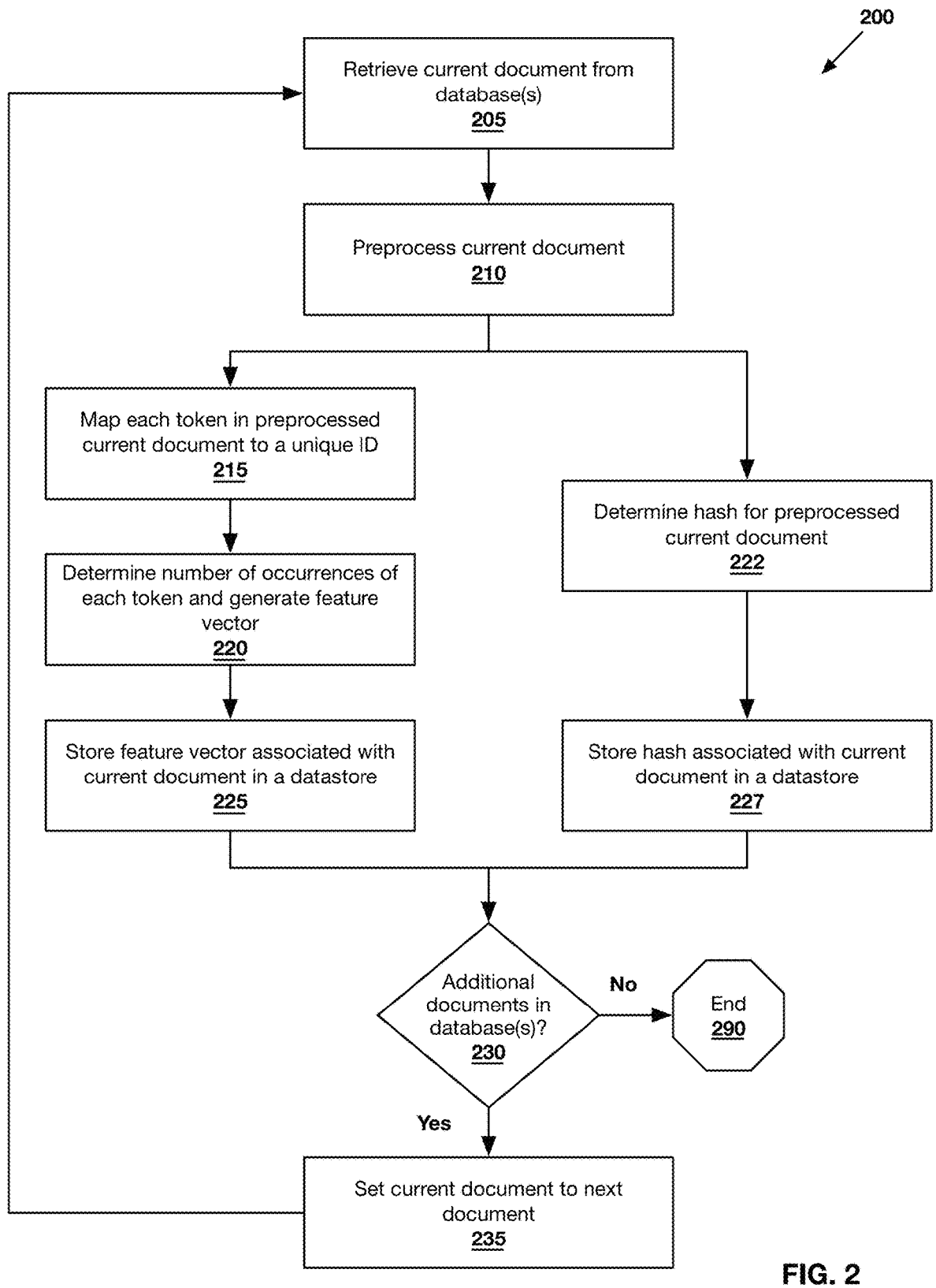
FIG. 2 shows an exemplary method 200 of scanning one or more data sources to retrieve documents, preprocessing the retrieved documents, generating a document feature vector for each of the preprocessed documents, and generating a hash for each of the preprocessed documents.

Referring to FIG. 2, an exemplary method 200 of scanning an unstructured data source to retrieve documents, preprocessing retrieved documents, and generating a document feature vector and a hash for each preprocessed document is illustrated. As shown, the method 200 begins at step 205, where a scanner scans one or more unstructured data sources to locate documents stored therein.

The term "document" is used herein to refer to any unstructured object, file, document, sequence, data segment, etc. A document may comprise or otherwise be represented by document information such as textual context and/or any associated metadata information. Exemplary textual content may include, but is not limited to, characters, words, sequences, symbols, etc. And exemplary metadata information may include, but is not limited to, date created, date modified, date last opened, tags, author, custodian, recipient, copyees, assignee, signatories, party names, audience, brand, language, personal identity information present, word count, page count, source, tone/sentiment, security level, attachment range, file type/extension, path name, hash value, signature date, effective date, and/or expiration date.

Exemplary documents may comprise textual documents, such as but not limited to, email messages, text messages, instant messages and other social media posts, word processing files (e.g., Microsoft Word™ documents), PDF files, spreadsheets (e.g., Microsoft Excel™ spreadsheets), presentations (e.g., Microsoft PowerPoint™ presentations), collaboration software, etc.

The system may search some or all documents stored by an organization across various unstructured data sources. In one embodiment, documents may be accessed over an internal and/or external network, the Internet, or the like. Exemplary data sources may include, for example, unstructured databases and file shares, semi-structured Big Data and NoSQL repositories (e.g., Apache Hadoop, RDB and MongoDB), cloud storage systems, collaboration tools, customer relationship management ("CRM") systems, data protection solutions, document management systems, ecommerce systems, human resources systems, user directories (e.g., Lightweight Directory Access Protocol ("LDAP")) and/or other internal or external applications.

In certain embodiments, the system may determine and/or receive data source information associated with one or more data sources, such as a name, location, type and/or access information of the data source. For example, a user may manually enter data source information into a client application and/or may upload a file containing such information. As another example, the system may be configured to automatically discover one or more data sources, along with any corresponding data source information. The system may employ open source tools such as NMAP, Cacti, Nagios, Icinga, and others to perform data source discovery.

In any event, the system may connect to one or more data sources based on the determined and/or received data source information and, once connected, the system may conduct a search for documents contained therein. In one embodiment, as documents are discovered in a data source, the system may retrieve and store such documents for preprocessing. In other embodiments, the system may store pointers to documents (e.g., a secure hash used for search), rather than the document itself for privacy reasons.

At step 210, a current document is preprocessed. Generally, preprocessing of a document may include one or more of: transforming document text to lowercase, removing (e.g., filtering) HTML, XML and/or other programming language tags, removing excess whitespace, removing punctuation, removing stop words, removing short words (e.g., words comprising less than 3 characters or less than 4 characters), removing numeric characters, and/or word stemming or lemmatization. It will be appreciated that the system may preprocess individual documents and/or may preprocess batches of documents retrieved from database.

In one embodiment, the system may remove one or more stop words from a document. Stop words may include parts of speech (e.g., articles, copulas, prepositions, etc.) and/or other common terms that do not contribute to characterization of the text (e.g., "the," "I," "we," "Inc.," etc.).

Preprocessing may additionally or alternatively include word stemming or lemmatization. That is, words may be reduced to their respective roots (e.g., parts of words common to all variants of that word). In this way, words with the same root may be grouped as the same word stem in downstream processing steps.

An example of a document text before and after preprocessing is shown in Table 1 below.

TABLE 1

Original Text Compared to Preprocessed Text

| Original Text | Preprocessed Text |
|---|---|
| <p class = "excerpt">Grouping and clustering free text is an important advance towards making good use of it. We present an algorithm for unsupervised text clustering approach that enables business to programmatically bin this data. </p> | group cluster free text important advance make good use present algorithm unsupervise text cluster approach enable business programmatically bin data |

At steps 215, 220 and 225, a document feature vector is generated for the preprocessed current document. Generally, the document feature vector may comprise a numerical representation of a document, such as an N-dimensional vector of numerical features representing a document. In one embodiment, 'N' corresponds to the number of unique words, or "tokens," in the corpora and the numerical features comprise a determined numerical value associated with each token (e.g., the number of occurrences of a given token in the respective document).

At step 215, each token in the preprocessed current document is mapped to a unique ID. In one embodiment, each of the tokens may be mapped to a unique ID number via the use of a dictionary comprising a vocabulary of terms, where each term is associated with a unique ID. In such embodiment, a dictionary may be constructed by (1) pre-scanning a training dataset (i.e., a plurality of preprocessed documents) to build up a vocabulary of terms and (2) associating each term with a unique ID.

Unfortunately, creating a dictionary requires processing power and time. Accordingly, in an alternative embodiment, each of the tokens may be mapped to a unique ID 215 via use of the so-called "hashing trick," which does not require a dictionary. In this case, a hash function (e.g., Adler-32, Cyclic redundancy check checksum, etc.) may be applied to a token and the resulting hash value may be used as the token's unique ID. In one particular embodiment, the Adler-32 hash function is employed, as such algorithm has been found to be very efficient when compared to other hash functions.

In one embodiment where the hashing trick is employed, the unique ID of a token may be determined by performing one or more additional mathematical calculations on the resulting hash value. For example, a unique ID may be determined for a given token by first applying a hash function to the token and then performing a modulus operation on the resulting hash value (i.e., dividing the hash value by a large number and using the remainder as the unique ID).

It will be appreciated that, in some cases, the above-described hashing trick may result in a plurality of different tokens being assigned the same unique ID. However, this scenario is very rare for large vocabulary sizes (e.g., greater than 10,000,000 terms). And, even if multiple tokens are associated with the same unique ID, the system typically resolves the token that is relevant for a specific cluster by comparing the number of documents in the cluster and the number of occurrences of each token, as detailed below.

At step 220, once unique IDs have been assigned to all of the tokens in the preprocessed current document, the number of occurrences of each token may be recorded to create a document feature vector representing the document (e.g., a bag-of-words ("BOW") numerical vector). And at step 225, the document feature vector may be stored in a datastore and associated with the document from which it was determined.

As shown, the system may preferably determine 222 and store 227 a hash for the preprocessed current document, in addition to the document feature vector. Generally, the system may perform the hashing process (steps 222 and 227) in parallel to the feature vector process (steps 215, 220, 225), such that the system may employ the results of these processes to efficiently compare documents to documents and/or documents to clusters during downstream processing steps.

It has surprisingly been found that the processing time required to cluster large numbers of documents can be significantly reduced by employing hashing in combination with vectorization. By way of explanation, although both processes may generally be employed to determine how similar one object is to another, hashing and vectorization have different strengths and weaknesses. For example, the computation time required to determine a hash for a given preprocessed document is an order of magnitude less than that required to determine a feature vector for the same document. As another example, while vectorization may be employed to identify similarities across a wide variety of documents, hashing can only be employed to identify documents that are very similar (i.e., nearly identical).

In one particular embodiment, the system may employ a similarity digest that is superficially similar to a cryptographic hash when performing the hashing process (steps 222 and 227). Generally, the similarity digests employed by the embodiments may include those that utilize schemes that allow for digests to be encoded and stored in a repository, such that one digest may be compared to another digest. For example, similarity digests may employ schemes based on feature extraction, a locality sensitive hashing ("LSH") scheme, a context triggered piecewise hashing ("CTPH") scheme, a fuzzy hash scheme, and/or a trend micro locality sensitive hashing ("TLSH") scheme.

More specifically, similarity digests employed by the embodiments may utilize one or more of the following schemes: Nilsimsa, Ssdeep, Min-wise independent permutations, SimHash, any of the schemes detailed in U.S. Pat. No. 7,272,602, titled "System and method for unorchestrated determination of data sequences using sticky byte factoring to determine breakpoints in digital sequences" (incorporated by reference herein in its entirety), any of the schemes detailed in Kornblum, Jesse, "Identifying almost identical files using context triggered piecewise hashing," Digital Investigation 3S (2006) S91-S97 (incorporated by reference herein in its entirety) and/or any of the schemes detailed in Oliver, Jonathan et al, "TLSH—A Locality Sensitive Hash," 4th Cybercrime and Trustworthy Computing Workshop, November 2013 Sydney, Australia, (incorporated by reference herein in its entirety).

It will be appreciated that, unlike conventional hash algorithms that can only be used to determine whether two objects are identical (e.g., MD5 or SHA-256), the similarity digests employed by the embodiments allow partial matches between objects to be determined. That is, the similarity digests may be used to hash data points into buckets so that data points near each other are located in the same buckets with high probability, while data points far from each other are likely to be in different buckets. This facilitates identification of observations with various degrees of similarity.

In any event, once a hash (i.e., a digest) is determined for the current document 222 and stored 227, the method continues to step 230 where the system determines whether there are additional documents in the data source(s) for which a document feature vector and a hash has not yet been generated. If so, the current document is set to the next document at step 235 and the method returns to step 205. However, if document feature vectors and hashes have been determined for all documents in the data source(s), the method may end 290.

In certain embodiments, the system may conduct preprocessing, vectorization and/or hashing of documents in parallel with a scanning process. As shown in Table 2, below, applying this strategy results in minimal overhead (e.g., about 30%) to the scanning process.

TABLE 2

Document Vectorization Overhead to Scanning Process for 1.2K Documents

| | Runtime Without Document Vectorization | Runtime With Document Vectorization | Change |
|---|---|---|---|
| Regular Scan | 0:02:40 | 0:03:29 | 30% |
| Regular Scan With Regex Classifiers | 0:02:42 | 0:03:36 | 33% |

Referring to FIG. 3, an exemplary method 300 of clustering documents is illustrated. As shown, the method begins at step 301, where the system determines a plurality of clusters. In one embodiment, the system may generate a least-recently-used ("LRU") cache of clusters, wherein the size of the cache may be automatically determined by the system and/or manually set by a user.

It will be appreciated that the term "cluster" generally describes documents that form a cluster, a cluster object, a cluster feature vector, a cluster hash list, cluster identification information, and/or any other information related to the cluster. For example, when referred to as retrieving or returning a cluster, the actual documents that form the cluster may not be returned; rather, a representation of the cluster (e.g., the cluster hash list and/or the cluster feature vector) may be returned or retrieved instead.

At step 305, a current document is retrieved from a datastore. Generally, each of the preprocessed documents may be stored by a queuing mechanism along with its associated feature vector and hash produced by, for example, the method 200 of FIG. 2 until the document is assigned to a cluster (e.g., via the method 300 shown in FIG. 3). In one embodiment, the vectors and hashes may be stored in an unstructured database (e.g., a MONGO database) and the system may be adapted to "listen" for changes in the database in order to begin the clustering method 300.

At step 311, the system may determine a comparison score between a hash of the current document and hashes stored in a hash list associated with an existing cluster (i.e., a "current cluster"). Generally, the comparison score may be determined by comparing the current document hash to each of the document hashes included in a hash list or "cluster hash" associated with the current cluster. It will be appreciated that a cluster hash may comprise a list of hashes of some or all of the documents that are associated with a given cluster. In one embodiment, a cluster hash may comprise a list of about 5 to about 15 document hashes (e.g., about 10 hashes), where each hash in the hash list is associated with a document that was recently added to the cluster.

For example, the Nilsima hash uses a 5-byte fixed-size sliding window that analyses the input on a byte-by-byte basis and produces trigrams of possible combinations of the input characters. The trigrams map into a 256-bit array (known as the "accumulator") to create the hash, and every time a given position is accessed, its value is incremented. At the end of the processing a 32-byte digest is created according to the following: if the values are above a certain threshold, the value is set to a 1; otherwise, if the values are below the threshold, the value is set to zero. Accordingly, to compare two hashes, the method may check the number of identical bits read to the same position. This produces a score from 0 (dissimilar) to 128 (identical or very similar objects).

At step 316, the system determines whether the current comparison score is greater than a first predetermined comparison threshold. In preferred embodiments, such first comparison threshold may be equal to a value of from about 110 to about 120 (e.g., about 115). If the current comparison score is greater than the first threshold, the document is assigned to the current cluster 350. Otherwise, the method continues to step 321.

At step 321, the system determines whether the current comparison score is greater than a maximum comparison score. It will be appreciated that the maximum comparison score relates to a comparison score between a given document hash and one of a plurality of clusters, wherein the maximum comparison score is greater than the comparison scores calculated for the document hash and all other clusters. In other words, the current document hash will be most similar to the cluster from which the maximum comparison score is determined.

It will be appreciated that a current comparison score will typically be determined by comparing the current document hash to each of a plurality of document hashes included in the hash list associated with the current cluster. For example, a first comparison score may be determined by comparing the current document hash to a first document hash in the hash list, a second comparison score may be determined by comparing the current document hash to a second document hash in the hash list, a third comparison score may be determined by comparing the current document hash to a third document hash in the hash list, etc.; and, in some embodiments, the "current comparison score" for the current document and the current cluster may be set to the maximum comparison score determined for the current document and all of the hashes in the hash list. In the context of the previous example, if the first comparison score is greater than all other comparison scores determined for the current document and the current cluster, the current comparison score will be set to the first comparison score for the purposes of completing steps 316 and 321.

In any event, if the current comparison score is greater than the maximum comparison score, the method continues to step 326, where the system sets the maximum comparison score to the current comparison score and sets the matching cluster to the current cluster. However, if the current comparison score is not greater than the maximum comparison score, the method skips step 326 and the maximum comparison score/matching cluster are not updated.

At step 331, the system determines whether comparison scores have been calculated between the current document hash and all of the existing clusters. If not, the system updates the current cluster to the next cluster at step 336 and returns to step 311. However, if comparison scores have been calculated for each existing cluster, the method continues to step 341.

At step 341, the system determines whether the maximum comparison score is greater than or equal to a second comparison threshold. In preferred embodiments this second comparison threshold is lower than the first comparison threshold. For example, the second comparison threshold may be from about 80 to about 90 (e.g., about 85). If the maximum comparison score is greater than the second comparison threshold, the method proceeds to step 350 (discussed below). Otherwise, the method continues on to step 309.

Beginning at step 309, the system employs feature vectors, rather than hashes, to again try to match the document to one of the clusters. Accordingly, the current cluster is set to the first cluster at step 309 and the system determines a similarity score between the current document feature vector and the current cluster at step 310. In one embodiment, the similarity score may be determined by calculating cosine similarity between the current document feature vector and the cluster feature vector of the current cluster (discussed below). The cosine similarity relates to the angle between document vectors when projected in multi-dimensional space, and such similarity measure is considered very accurate for word vectors. Importantly, the measure is influenced only by the orientation and not the magnitude of the vectors, and the measure simplifies the calculations that are performed when a document feature vector is compared to a cluster feature vector and when a cumulative vector is calculated (i.e., when a document is added to a cluster).

In certain embodiments, each cluster may be associated with a cluster feature vector indicative of the documents in that cluster. That is, a feature vector describing and/or generally representative of all the documents in a cluster may be generated and/or used in determining a similarity score between the cluster and a given document feature vector. In some embodiments, the cluster feature vector may be a mathematical approximation or calculation of the feature vector of the cluster. For example, the cluster feature vector may be an average of all the vectors of all the documents associated with that cluster. In alternative embodiments, the feature vector of one document may be selected as the representative cluster feature vector. The selected feature vector may be a feature vector most representative of the documents in the cluster.

At step 315, the system determines whether the current similarity score is greater than a first predetermined similarity threshold. In preferred embodiments, such first similarity threshold may range from about 0.9 to about 0.97 (e.g., about 0.91, about 0.92, about 0.93, about 0.94, about 0.95, about 0.96 or about 0.97). If the current similarity score is greater than the first similarity threshold, the document is assigned to the current cluster 350. Otherwise, the method continues to step 320.

At step 320, the system determines whether the current similarity score is greater than a maximum similarity score.

It will be appreciated that the maximum similarity score relates to a similarity score between a given document feature vector and one of a plurality of clusters, wherein the maximum similarity score is greater than the similarity scores calculated for the document feature vector and all other clusters. In other words, the current document feature vector will be most similar to the cluster from which the maximum similarity score is determined.

In any event, if the current similarity score is greater than the maximum similarity score, the method continues to step 325, where the system sets the maximum similarity score to the current similarity score and sets the matching cluster to the current cluster. However, if the current similarity score is not greater than the maximum similarity score, the method skips step 325 and the maximum similarity score/matching cluster are not updated.

At step 330, the system determines whether a similarity score has been calculated between the current document feature vector and all of the existing clusters. If not, the system updates the current cluster to the next cluster at step 335 and returns to step 310. However, if similarity scores have been calculated for each existing cluster, the method continues to step 340.

At step 340, the system determines whether the maximum similarity score is greater than or equal to a second predetermined similarity threshold. In preferred embodiments this second similarity threshold is lower than the first threshold—at least about 0.7 to about 0.9 (e.g., about 0.7, about 0.75, about 0.8, about 0.85 or less than about 0.9). If not, a new cluster is created at step 345 and the new cluster is set as the matching cluster. However, if the maximum similarity score is greater than the second similarity threshold, the method proceeds to step 350.

At step 350, the system assigns the current document to the matching cluster. As discussed above, the matching cluster corresponds to (1) the cluster from which the maximum comparison score was calculated (i.e., when the maximum comparison score—which relates to a comparison of a document hash to a cluster hash list—is greater than or equal to the second comparison threshold); (2) the cluster from which the maximum similarity score was calculated (i.e., when the maximum similarity score—which relates to a distance or similarity between a document vector and a cumulative cluster vector—is greater than or equal to the second similarity threshold); or (3) to a new cluster created at step 345 (i.e., when the maximum similarity score is less than the second similarity threshold).

Either way, at step 355, the system updates cluster information associated with the matching cluster. Generally, the system may update the cluster hash of the matching cluster by adding the hash of the current document to a list of representative document hashes (e.g., a "first-in-first-out" hash list of about 10 document hashes).

The system may also create a cumulative feature vector of all documents that belong to the matching cluster at step 355. Importantly, comparison of document feature vectors to this cumulative vector yields good results when cosine similarity is used in contrast to other distance metrics such as Euclidean or Jaccard distance metrics.

At step 360, the system determines whether there are any documents that have not yet been assigned to a matching cluster. If so, the system updates the current document vector to the next document at step 365 and the method is repeated in order to cluster the next document. However, if no unclustered documents remain, the method continues to final step 370.

At final step 370, after all documents have been assigned to a matching cluster, the system may attempt to merge or combine similar clusters. In one embodiment, the system may calculate pairwise cosine similarity between all clusters or a subset of clusters to determine a similarity score between each cluster. When the similarity score between a pair of clusters is greater than or equal to the second predetermined similarity threshold (e.g., about 0.7), such clusters may be combined. It will be appreciated that, when a cluster is combined with another cluster, its cumulative vector (i.e., its cluster feature vector) is added to the cluster feature vector of the combined cluster and its hash list is merged with the hash list of the combined cluster.

Although not shown, it will be appreciated that, in some embodiments, the clusters may be periodically sorted during the clustering method 300. For example, the clusters may be sorted in descending order according to size. This allows for faster assignment of document feature vectors to matching clusters in environments with large clusters. Additionally or alternatively, in certain embodiments—especially when a large number of unstructured documents need to be clustered-some or all of the above-described steps may be performed in parallel and the generated clusters can be merged throughout the process.

It will also be appreciated that the size and tightness of the clusters is controlled by the first and second thresholds used. For example, higher thresholds (i.e., thresholds that are closer to 1.0) will yield a large number of smaller clusters. Additionally, using higher thresholds will result in a tighter distribution of cosine similarity scores between the documents in each cluster and the cluster feature vector of the corresponding, matching cluster.

As an experiment, the inventive clustering methods were employed to cluster 7,438 unstructured documents, including 38 Non-Disclosure Agreements ("NDAs"). Specifically, a method employing only feature vectors ("vectorization-only method") and a method employing both feature vectors and hashes (the "combined method") were both compared to a traditional K-means clustering algorithm. K-Means is a popular unsupervised machine learning algorithm that finds "K" number of centroids and assigns every data point to the closest cluster, keeping the centroids as small as possible. The K-means algorithm works iteratively to optimize the position of the centroids and stops once the centroids have stabilized or the number of iterations has been reached.

Figure 4A:
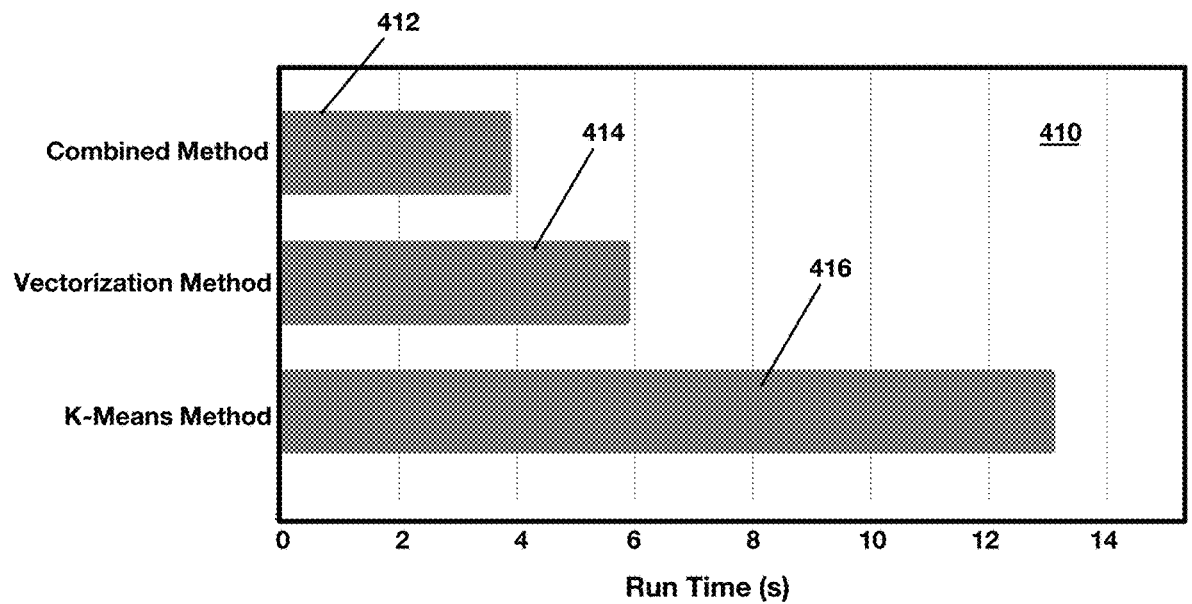
FIGS. 4A-4B show graphical results 410, 420 relating to document clusters generated during experiments, including computation speed and cluster sizes.

As shown in the graph 410 illustrated in FIG. 4A, both inventive methods (412, 414) significantly outperformed conventional K-means clustering 416 with respect to computation time, and the combined method 412 was about 30% faster than the vectorization-only method 414. It will be appreciated that, unlike the inventive clustering methods, K-means clustering requires a research phase in order to determine the optimal number of clusters to generate. The data 416 shown in the graph 410 does not include any additional time for this research stage.

As shown in Table 3, below, the combined method also outperformed the K-means algorithm with respect to preciseness of clusters generated. The combined method correctly split the 7,438 unstructured documents into 7 clusters, including a single cluster containing all 38 NDAs. Although the K-Means algorithm also produced 7 clusters, 3 Of the 38 NDAs were incorrectly assigned to a large cluster (Cluster 1), which contained very different files.

TABLE 3

Document Clustering Performance

| Cluster | Clusters Sizes (# Documents) | |
| --- | --- | --- |
|  | Combined Method | K-Means |
| 1 | 1635 | 1638 |
| 2 | 1545 | 1545 |
| 3 | 1410 | 1410 |
| 4 | 1280 | 1280 |
| 5 | 1130 | 1130 |
| 6 | 400 | 400 |
| 7 (NDAs) | 38 | 35 |

Figure 4B:
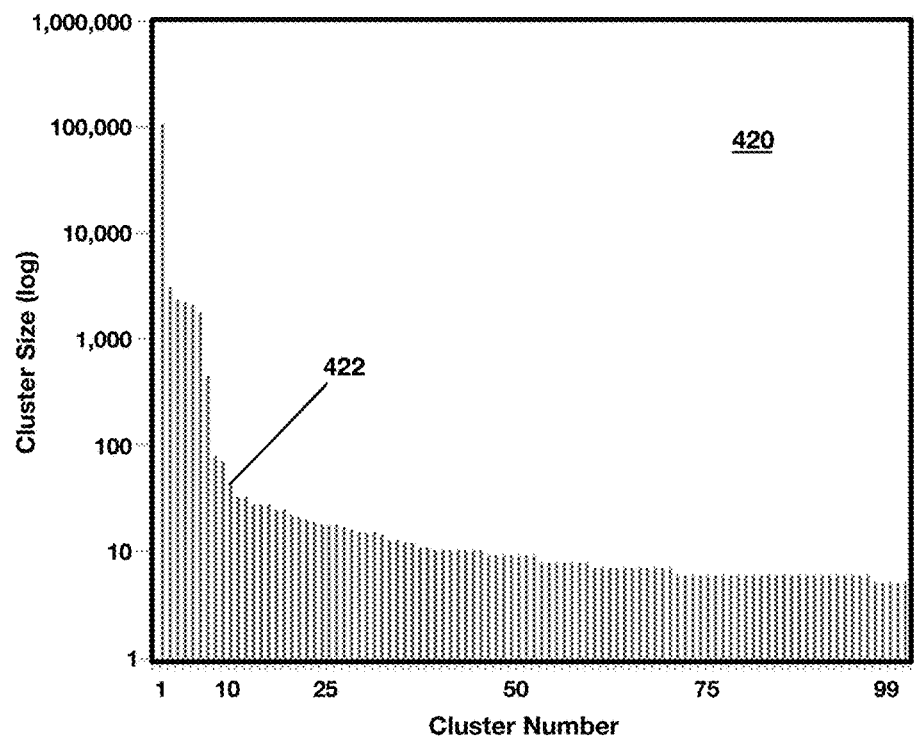

As another experiment, the vectorization-only method was employed to cluster about 120,000 unstructured documents with minimal overhead to the scanning process runtime. As shown in the graph 420 illustrated in FIG. 4B, most of the files (96.5%) were correctly clustered into the 10 largest clusters 422. A similar distribution is expected for many organizations that store petabytes of documents because most of the files stored by such organizations will comprise templates filled with different data (e.g., company forms, letters and/or presentations). Because the backbone of many documents will be similar, document feature vectors calculated for such documents should also be similar, which will result in many documents being clustered together.

Figure 5A:
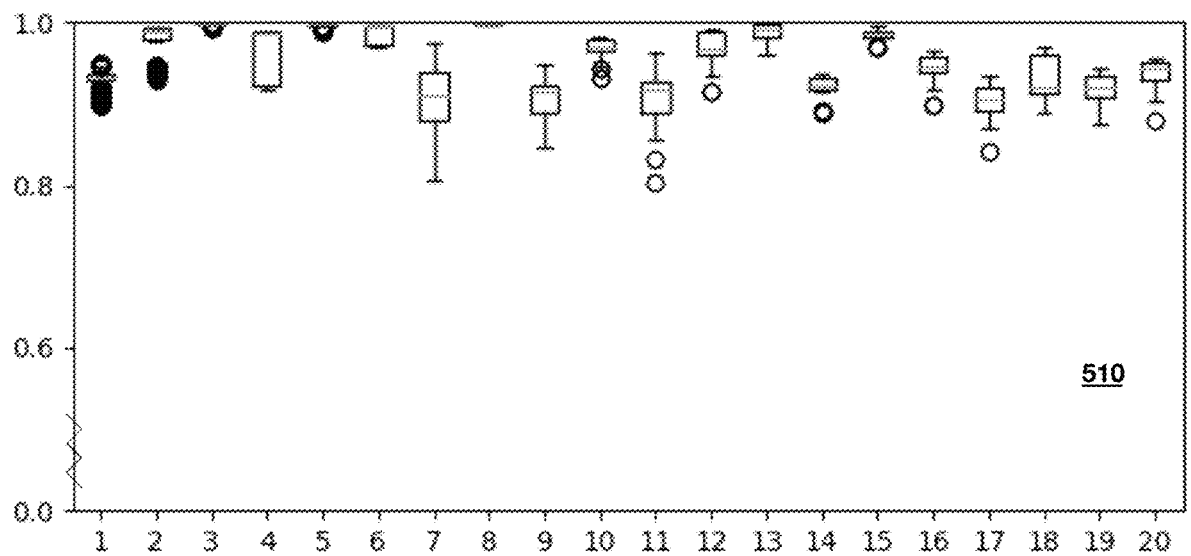
FIGS. 5A-5B show graphical results 510, 520 relating to document clusters generated during experiments, including distributions of cosine similarities between documents and corresponding clusters.
Figure 5B:
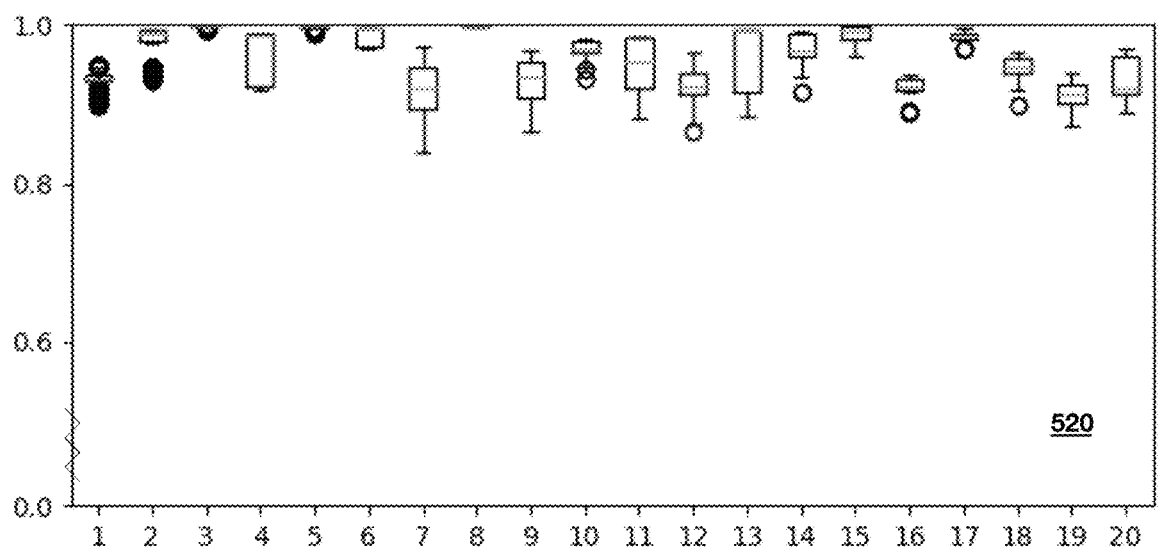

FIGS. 5A-5B illustrate a distribution of cosine similarities of document feature vectors to the cluster feature vector of their corresponding, matching clusters. For better visualization, only the 20 largest clusters are shown. FIG. 5A shows the distribution 510 before cluster merging and FIG. 5B shows the distribution 520 after cluster merging. Accordingly, it will be appreciated that the higher variance shown in FIG. 5B is due to cluster merging As shown in FIGS. 5A-5B, using a first similarity threshold of 0.90 and a second similarity threshold of 0.85 yielded clusters with a narrow distribution of cosine similarity scores between the documents in each cluster and the cluster feature vector of the corresponding cluster. It will be appreciated that, because the clustering method is dynamic, some clusters may eventually contain documents associated with a similarity score that is less than the second threshold. However, this happens quite rarely and can be easily handled by identifying such clusters and assigning the outlier documents to other clusters.

The above-described dynamic clustering methods and the clusters generated by such methods may be utilized by many downstream applications. In one embodiment, the system may determine and display resulting clusters and/or various information/statistics relating to the documents associated with such clusters. For example, the system may determine, store and/or display statistics associated with one or more clusters, such as: the size of the cluster, average size of the documents that compose the cluster, the distribution of file types within the cluster, the distribution of the documents across the different scanned data stores, number of personal data found in the cluster, etc. It will be appreciated that the documents, clusters, and/or information about the documents and/or clusters may be stored in one or more databases.

Figure 6:
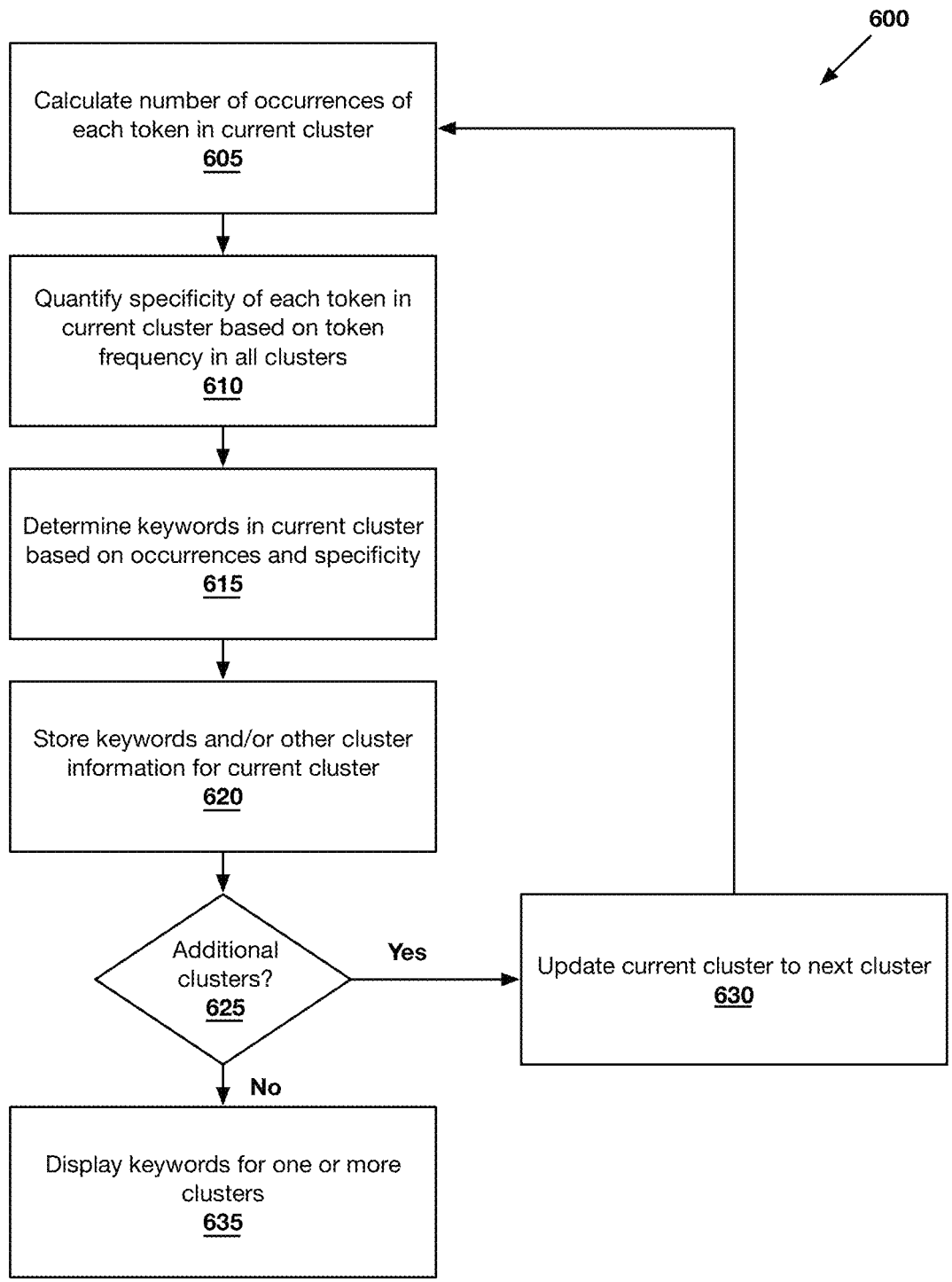
FIG. 6 shows an exemplary method 600 of determining and displaying cluster keywords according to an embodiment.

Referring to FIG. 6, an exemplary method 600 of determining and displaying cluster keywords is illustrated. Generally, the system may calculate representative or important tokens (i.e., keywords) for each of the clusters and display a number of such keywords to a user (e.g., based on user preference). In this way, the system may provide a user with insight into the content of documents associated with one or more clusters.

As shown, the method 600 begins at step 605, where the system calculates the number of times each token occurs in a current cluster (i.e., the token frequency (tf)). Next, at step 610, the system quantifies the specificity of each token according to the following formula:

$$icf(t, c) = \log\left(\frac{N}{1 + |\{c \in C : t \in T\}|}\right)$$

where: N equals the total number of clusters and $1+|\{c \in C: t \in T\}|$ equals the number of clusters that contain the token. To avoid division by zero, the denominator is incremented by one.

At step 615, the system determines one or more important tokens or "keywords" for the current cluster. In one embodiment, the system may determine such keywords by calculating TFICF for each token in the current cluster according to the following equation:

$$tficf(t,c,C) = tf(t,c) \cdot icf(t,C)$$

As shown, the system determines TFICF for a given token by multiplying its token frequency (tf) and its specificity (kn. The incorporation of the specificity factor diminishes the weight of tokens that occur very frequently in a given cluster and increases the weight of tokens that occur rarely.

Upon calculating TFICF for each of the plurality of tokens in the current cluster, the system may then compare the calculated values in order to select one or more keywords from the available tokens. In one embodiment, the system may select a predetermined number of keywords corresponding to the tokens having the highest TFICF scores (e.g., a predetermined number that may be configurable by a user). In another embodiment, the system may classify any token having a TFICF value greater than a predetermined minimum as a keyword. And, in yet another embodiment, the system may classify a certain percentage of tokens having the highest TFICF values as keywords (e.g., the top 1% of tokens or the top 5% of tokens).

In any event, once one or more keywords have been determined for the current cluster 615, the method continues to step 620, where the determined keywords and/or any other cluster or document information may be stored in one or more databases.

It will be appreciated that the above steps may be repeated, as desired or required, for each cluster. Accordingly, at step 625, the system determines whether keywords should be generated for any additional clusters. If so, the system may update the current cluster to the next cluster at step 630 and return to step 605. Otherwise, the method may continue to step 635, where the system displays the keywords determined for one or more clusters.

Figure 7:
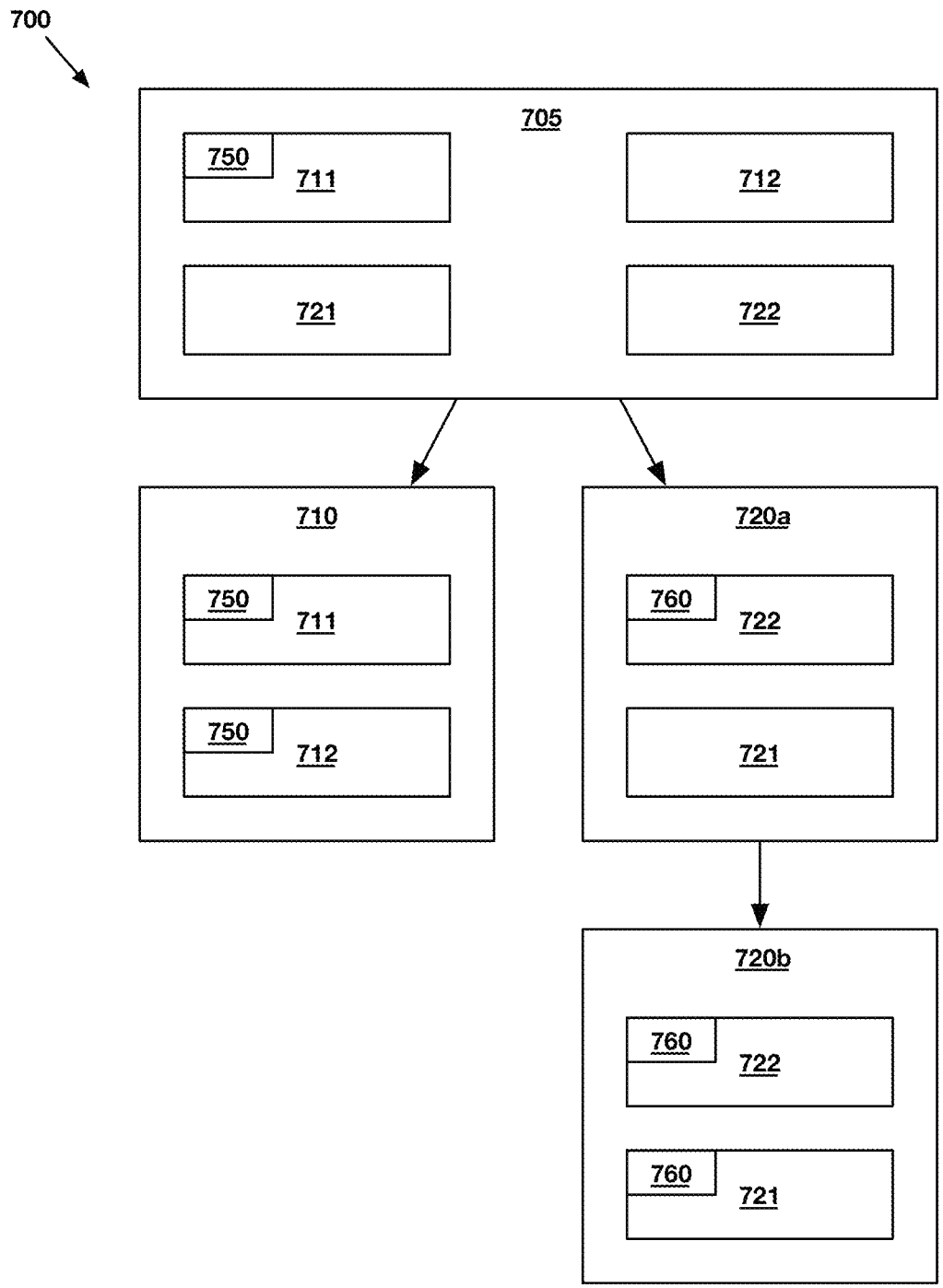
FIG. 7 shows an exemplary document labeling method 700 according to an embodiment.

Referring to FIG. 7, an exemplary document labeling method 700 is illustrated. Generally, document labeling comprises categorizing documents based on content (e.g. "sensitive," "marketing," "financial," etc.). Document labeling may utilize the availability of the clustering algorithm as an unsupervised machine learning method (i.e., where manual labeling is not required) and/or the power of supervised labeled data.

As shown, a number of documents (711, 712, 721 and 722) originally stored in a data source 705 may be clustered as described above. For example, documents 711 and 712 may be assigned to a first cluster 710 and documents 721 and 722 may be assigned to a second cluster 720*a*.

In one embodiment, when a document 711 is manually labeled 750 before clustering, such label may automatically be propagated to all files (e.g., document 712) in a cluster 710 to which the previously labeled document is assigned. In another embodiment, one or more documents 722 in a given cluster 720*a* may be selected and manually labeled 760 by a user, and such label may then be propagated to all documents (e.g., document 721) in the corresponding cluster 720*b*.

Discovering document duplications in large unstructured data stores is another major application of the described document clustering methods. The naive approach of comparing each document to all other documents in a data store may possibly detect duplications, but is too time consuming and cannot scale. Document clustering can greatly facilitate the detection of duplicate documents by dramatically reducing the number of documents that should be compared using expensive traditional algorithms. For example, following the clustering process, any documents that belong to the same cluster and that share exactly the same document feature vector may be automatically marked as possible duplications. In one embodiment, the raw content of such documents may optionally be compared using traditional algorithms to draw a definitive conclusion.

Figure 8:
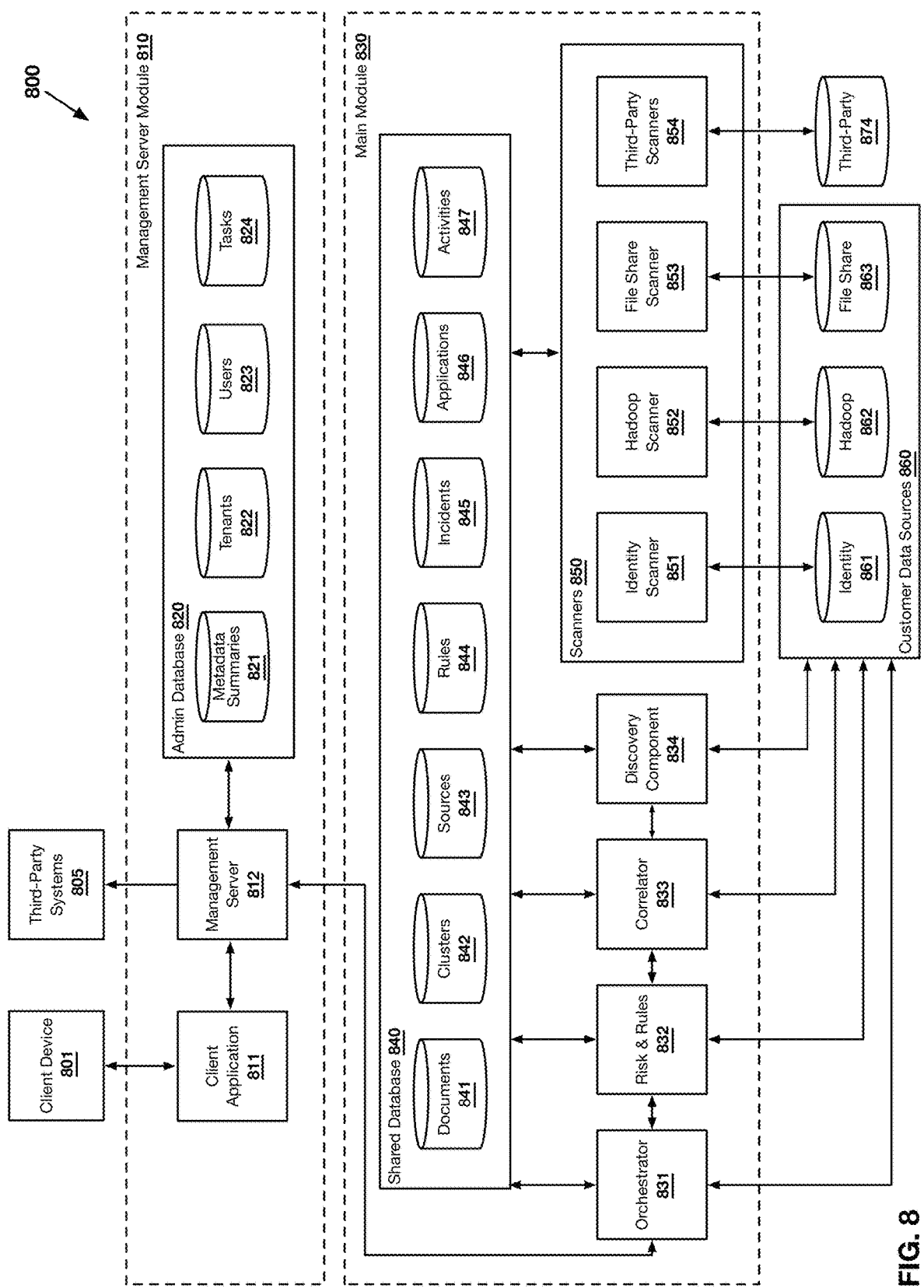
FIG. 8 shows an exemplary system 800 according to an embodiment.

Referring to FIG. 8, an exemplary system according to an embodiment is illustrated. As shown, the system 800 may comprise a microservices architecture that can be deployed from a public cloud or inside an organization's data center. This architecture allows the system to be deployed as a simple, single-server deployment or as a multitier, hybrid cloud environment comprising one or more on-premise and/or cloud-based applications.

The core system components may be designed as microservices that may be packaged in containers (e.g., DOCKER containers) to facilitate scalability and to allow flexible deployments. When components are decoupled and can each run in their own isolated environment, it is possible to scale the system by adding more instances of relevant microservices. The container images can be managed, version controlled and downloaded from a container hub, or loaded from compressed files in case the organization's environment does not allow hub access. Generally, each of the components may communicate via a REST API (or a message queue for asynchronous jobs), and most services may be stateless. It will be appreciated that it is possible for several microservices to share the same container.

Although the system may employ a container service, the core deliverables may still be maintained in plain code (e.g., JavaScript, Java, etc.). Accordingly, the components can be packaged in different virtual machine images or even installed by an installer, if desired or required.

As shown, the system may comprise any number of modules, including but not limited to, a management server module 810, which can be deployed either in the cloud or on-premise; and a main module 830 which is typically deployed locally. In one embodiment, the main module 830 comprises a number of components, such as a shared database component 840, an orchestrator component 831, a correlator component 833, a risk analysis and rules evaluation component 832, a data source discovery component 834, and a number of scanner worker components 850 (e.g., an identity scanner 851, a Hadoop scanner 852, a file share scanner 853, and/or a third-party system scanner 854).

The shared database component 840 may store information in a number of database tables (841-847), such as: a documents table 841, a clusters table 842, a data sources table 843, a rules table 844, an incidents table 845, an applications table 846 and/or an activities table 847. As shown various components and/or microservices may access the shared database component 840 to store and/or retrieve information.

In certain embodiments, a data source discovery component 834 may be employed. The discovery component may be adapted to search for available data sources (e.g., using network discovery). Data source information associated with found data sources may be stored in the shared database 840 (e.g., in the data sources table 843).

As shown, the system may comprise a number of distributed, on-premise scanner worker components 850 that are adapted to scan for and retrieve documents from various data sources 860. As discussed above, exemplary document findings may include a document type, a document content and/or link, location information and/or a scanner ID. The scan results may also include document metadata.

The various scanners may connect to an organization's data source(s) 860 in order to find documents, as discussed above. In certain embodiments, the scanner(s) 850 may expose an API to: start the scan, check status, and/or retrieve results relating to documents. The scanner(s) 850 may submit a job to run a scan based on values in an input file. And such scanners may store results in the shared database 840 via the API.

In certain embodiments, the system may integrate with third-party systems and applications, such as data protection systems. A third-party scanner 854 may be employed to retrieve documents from a database 874 relating to such third-party systems. Additionally or alternatively, the system may expose an API for third-party systems 805 and applications to query stored data and/or metadata.

Generally, the system may be configured to scan multiple data sources 860 of multiple types (e.g. Identity data sources 861, Hadoop data sources 862, file share data sources 863, and so on). In one embodiment, each type of data source (861-863) may be scanned by a scanner (851-853) specifically adapted to scan that type of data source. In other embodiments, a single scanner may be employed to scan multiple types of data sources. Each of the scanners 850 may leverage the target data source's 860 native search capabilities and/or may run as part of the data source. For example, a Hadoop scanner 852 may run a MapR job to scan a Hadoop data source 862.

Scalability may be achieved by adding more instances of a given scanner, where each scanner can pick up a scanning job and run in parallel to other scanners. Each scanner instance may check the shared database to see whether there are pending jobs ("scanning tasks") for it to take. And, when a scanning task exists, an appropriate scanner may be automatically triggered to perform the scan.

For some scanners 850, it may be desirable to achieve parallelism by splitting the work into separate scans. For example each type of document may be separated to a different scan (e.g., a first scan may search for a first type of document and a second scan may search for a second type of document). As another example, scans may be separated by alphabetical splitting (e.g., a first scan may search for documents beginning with letters a-f and a second scan may search for documents beginning with letters g-z). For certain scanners the system's native parallelism may be exploited.

In one embodiment, the system may comprise an orchestrator component 831 adapted to call and coordinate separate handlers and/or microservices. For example, the orchestrator component may interact with scanner components 850, the correlator 833, the risk and rules component 832, data sources 860, the shared database component 840 and/or the management server component 812. Generally, the orchestrator component 831 receives information relating to a data subject's personal information and prepares the information for the scanners 850 (e.g., via input files). It may also trigger the scanners and, upon completion, retrieve the results and transmit the same to the shared database component with additional metadata.

The orchestrator component 831 may be responsible for one or more of the following: providing configuration data for the scanners 850 (via input from a user); scheduling the scans, refreshes etc.; executing correlation logic; executing rule evaluation and generating violations; and/or running business information processing (e.g. summary, aggregation, etc. required for user interface screens). In certain embodiments, the orchestrator 831 may generate metadata summaries and/or upload the same to the management server component 812. The orchestrator component 831 can also run further processing, such as risk calculations and compliance determinations.

An exemplary orchestrator workflow may include the following steps: (1) run scan of data source(s); (2) check when finished; (3) prepare a given scanner launch by retrieving, from the correlator component 833, a list of documents to scan and creating an input file with the document information; (4) run the given scanner 850 with the input file; (5) determine that the scanner has completed the scan; and (6) call the correlator component to review the scan results. Depending on specific requirements and/or constraints of any of the scanners, results may be written directly to the shared database 840 such that the orchestrator component 831 can read the results directly when the scan is complete.

The correlator component 833 may be employed to preprocess documents and/or cluster documents according to the above described processes. It will be appreciated that documents may include sensitive values. Where possible, the system may only store hashed pointers to documents. Where not possible, all temporary data may be wiped.

In certain embodiments, the system may further comprise a risk and rules component 832 that provides activity information relating to data sources 860, including but not limited to, applications, accounts, and/or personal information records that are used or accessed. Such activity data may be determined via STEM, digital asset management ("DAM") and/or cloud access security broker ("CASB") products. And such data may be stored in the shared database (e.g., in the activities table 847).

Still referring to FIG. 8, the system further comprises a cloud-based management server module 810. This module comprises a number of components, including an administrative database component 820, a management server 812, and a client application component 811.

The administrative database component 820 may store information in a number of database tables (821-824), such as a metadata summaries table 821, a tenants information table 822, a users table 823 and/or a tasks table 824. As shown various components and/or microservices may access the administrative database component 820 to store and/or retrieve information.

The system may further comprise a client application 811 to display information in graphical format to any number of users. The client application 811 may comprise a multi-tenant, web-based application (e.g., using AngularJS) that runs on a web browser of a client device 801. The client application may allow for the creation and viewing of documents, document information, clusters and/or cluster information through the remote management of the on-premise elements of the different tenants. The client application 811 may comprise a SaaS distributed application packaged in containers and remotely hosted to allow simple porting to be delivered as an on-premise, private-cloud application.

In certain embodiments, a user may access the client application to perform customer registration activities. For example, the client application may allow the user to download and register on-premise elements; setup and manage personal information discovery tasks; perform software updates to self-service elements; monitor system health; and/or access any user interface screens of the platform.

Although not shown, in certain embodiments, an analytics and configuration component may be employed to provide the backend for an API consumed by one or more user interface screens of the client application. This component may send instructions to the main module 830 by adding activities, such as activities polled by the main module.

Embodiments of the subject matter and the functional operations described in this specification can be implemented in one or more of the following: digital electronic circuitry; tangibly embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a front end component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references, including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method of clustering a plurality of documents, the method comprising:
   receiving a plurality of documents from one or more data sources;
   preprocessing a document in the plurality of documents to generate preprocessed text comprising a plurality of tokens;
   applying a hashing function to the preprocessed text to calculate a hash of the document;
   determining a feature vector of the document based on the preprocessed text;
   retrieving a set of clusters, each cluster associated with one or more associated documents, a hash list, and a cumulative feature vector;
   determining a comparison score between the hash of the document and each of the hash lists of the clusters;
   determining a similarity score between the feature vector of the document and each of the cumulative feature vectors of the clusters; and
   associating the document with a cluster based on the determined comparison scores or the determined similarity scores;
   determining a cluster similarity score between the cumulative feature vectors of a first cluster and a second cluster in the set of clusters; and
   merging the first cluster with the second cluster upon determining that the cluster similarity score is greater than or equal to a cluster similarity threshold, said merging comprising:
      associating the associated documents of the first cluster with the second cluster;
      adding the cumulative feature vector of the first cluster to the cumulative feature vector of the second cluster; and
      adding one or more hashes included in the hash list of the first cluster to the hash list of the second cluster.

2. A computer-implemented method according to claim 1, further comprising:
   determining that the comparison score between the hash of the document and the hash list of a matching cluster in the set of clusters is greater than or equal to a comparison threshold,
   wherein said associating the document with a cluster comprises associating the document with the matching cluster.

3. A computer-implemented method according to claim 1, further comprising:
   upon determining that none of the determined comparison scores is greater than or equal to a first comparison threshold, determining a maximum comparison score from the determined comparison scores, the maximum comparison score corresponding to a matching cluster in the set of clusters; and
   determining that the maximum comparison score is greater than or equal to a second comparison threshold that is lower than the first comparison threshold,
   wherein said associating the document with a cluster comprises associating the document with the matching cluster.

4. A computer-implemented method according to claim 3, wherein:
   the first comparison threshold is from about 110 to about 120; and
   the second comparison threshold is from about 80 to about 90.

5. A computer-implemented method according to claim 1, wherein the hashing function employs a scheme selected from the group consisting of: feature extraction, locality sensitive hashing ("LSH"), context triggered piecewise hashing ("CTPH"), fuzzy hashing, and trend micro locality sensitive hashing ("TLSH").

6. A computer-implemented method according to claim 1, wherein:
   said determining a similarity score between the feature vector of the document and each of the cumulative feature vectors of the clusters is performed upon determining that none of the determined comparison scores is greater than or equal to a comparison threshold; and
   said associating the document with a cluster is based on the determined similarity scores.

7. A computer-implemented method according to claim 6, further comprising:
   determining that the similarity score between the feature vector of the document and the cumulative feature vector of a matching cluster in the set of clusters is greater than or equal to a similarity threshold,
   wherein said associating the document with a cluster comprises associating the document with the matching cluster.

8. A computer-implemented method according to claim 6, further comprising:
   upon determining that none of the determined similarity scores is greater than or equal to a first similarity threshold, determining a maximum similarity score from the determined similarity scores, the maximum similarity score corresponding to a matching cluster in the set of clusters; and
   determining that the maximum similarity score is greater than or equal to a second similarity threshold that is lower than the first similarity threshold,
   wherein said associating the document with a cluster comprises associating the document with the matching cluster.

9. A computer-implemented method according to claim 8, wherein:
   the first similarity threshold is at least about 0.9; and
   the second similarity threshold is from about 0.7 to about 0.85.

10. A computer-implemented method according to claim 1, wherein said generating a feature vector of the document comprises:
    mapping each of the plurality of tokens in the preprocessed text to a respective unique ID; and
    determining, for each of the unique IDs, a count of the tokens mapped thereto.

11. A computer-implemented method according to claim 10, wherein the unique ID to which each of the tokens is mapped is determined based on a hash calculated for the respective token.

12. A computer-implemented method according to claim 1, wherein each of the similarity scores is determined by calculating a cosine similarity between the feature vector of the document and the cumulative feature vector of the respective cluster.

13. A computer-implemented method according to claim 1, wherein said associating the document with a cluster comprises:
adding the hash of the document to the hash list of the cluster; and
adding the feature vector of the document to the cumulative feature vector of the cluster.

14. A computer-implemented method according to claim 1, wherein associating the document with a cluster comprises:
upon determining that none of the determined comparison scores is greater than or equal to a comparison threshold and none of the determined similarity scores is greater than or equal to a similarity threshold:
associating the document with a new cluster;
designating the feature vector of the document as the cumulative feature vector of the new cluster; and
adding the hash of the document to the hash list of the new cluster.

15. A computer-implemented method according to claim 1, further comprising:
determining keywords of a cluster in the set of clusters by:
determining a set of tokens for the cluster, the set of tokens comprising all of the tokens included in the preprocessed text generated for each of the documents associated with the cluster;
calculating a Term Frequency Inverse Cluster Frequency ("TFICF") value for each token in the set of tokens;
selecting a number of selected tokens from the set of tokens based on the calculated TFICF values; and
designating each of the selected tokens as a keyword; and
displaying the keywords of the cluster.

16. A machine-readable medium having program instructions stored thereon, the instructions capable of execution by a processor and defining the steps of:
receiving a plurality of documents from one or more data sources;
preprocessing a document in the plurality of documents to generate preprocessed text comprising a plurality of tokens;
applying a hashing function to the preprocessed text to calculate a hash of the document;
determining a feature vector of the document based on the preprocessed text;
retrieving a set of clusters, each cluster associated with one or more associated documents, a hash list, and a cumulative feature vector;
determining a comparison score between the hash of the document and each of the hash lists of the clusters;
determining a similarity score between the feature vector of the document and each of the cumulative feature vectors of the clusters; and
associating the document with a cluster based on the determined comparison scores or the determined similarity scores;
determining a cluster similarity score between the cumulative feature vectors of a first cluster and a second cluster in the set of clusters; and
merging the first cluster with the second cluster upon determining that the cluster similarity score is greater than or equal to a cluster similarity threshold, said merging comprising:
associating the associated documents of the first cluster with the second cluster;
adding the cumulative feature vector of the first cluster to the cumulative feature vector of the second cluster; and
adding one or more hashes included in the hash list of the first cluster to the hash list of the second cluster.

17. A machine readable medium according to claim 16, wherein the instructions further define the steps of:
upon determining that none of the determined comparison scores is greater than or equal to a first comparison threshold, determining a maximum comparison score from the determined comparison scores;
determining that the maximum comparison score is less than a second comparison threshold,
wherein the second comparison threshold is lower than the first comparison threshold;
upon determining that none of the determined similarity scores is greater than or equal to a first similarity threshold, determining a maximum similarity score from the determined similarity scores, the maximum similarity score corresponding to a matching cluster from the set of clusters; and
determining that the maximum similarity score is greater than or equal to a second similarity threshold,
wherein the second similarity threshold is lower than the first comparison threshold,
wherein said associating the document with a cluster comprises:
associating the document with the matching cluster;
adding the hash of the document to the hash list of the matching cluster; and
adding the feature vector of the document to the cumulative feature vector of the matching cluster.

18. A machine readable medium according to claim 17, wherein the instructions further define the steps of:
determining a set of tokens for the matching cluster, the set of tokens comprising all of the tokens included in the preprocessed text generated for each of the documents associated with the matching cluster;
calculating a Term Frequency Inverse Cluster Frequency ("TFICF") value for each token in the set of tokens;
selecting, from the set of tokens, a number of selected tokens based on the calculated TFICF values;
designating each of the selected tokens as a keyword of the matching cluster; and
displaying the keywords of the matching cluster via a user interface.

* * * * *